Figure 1:
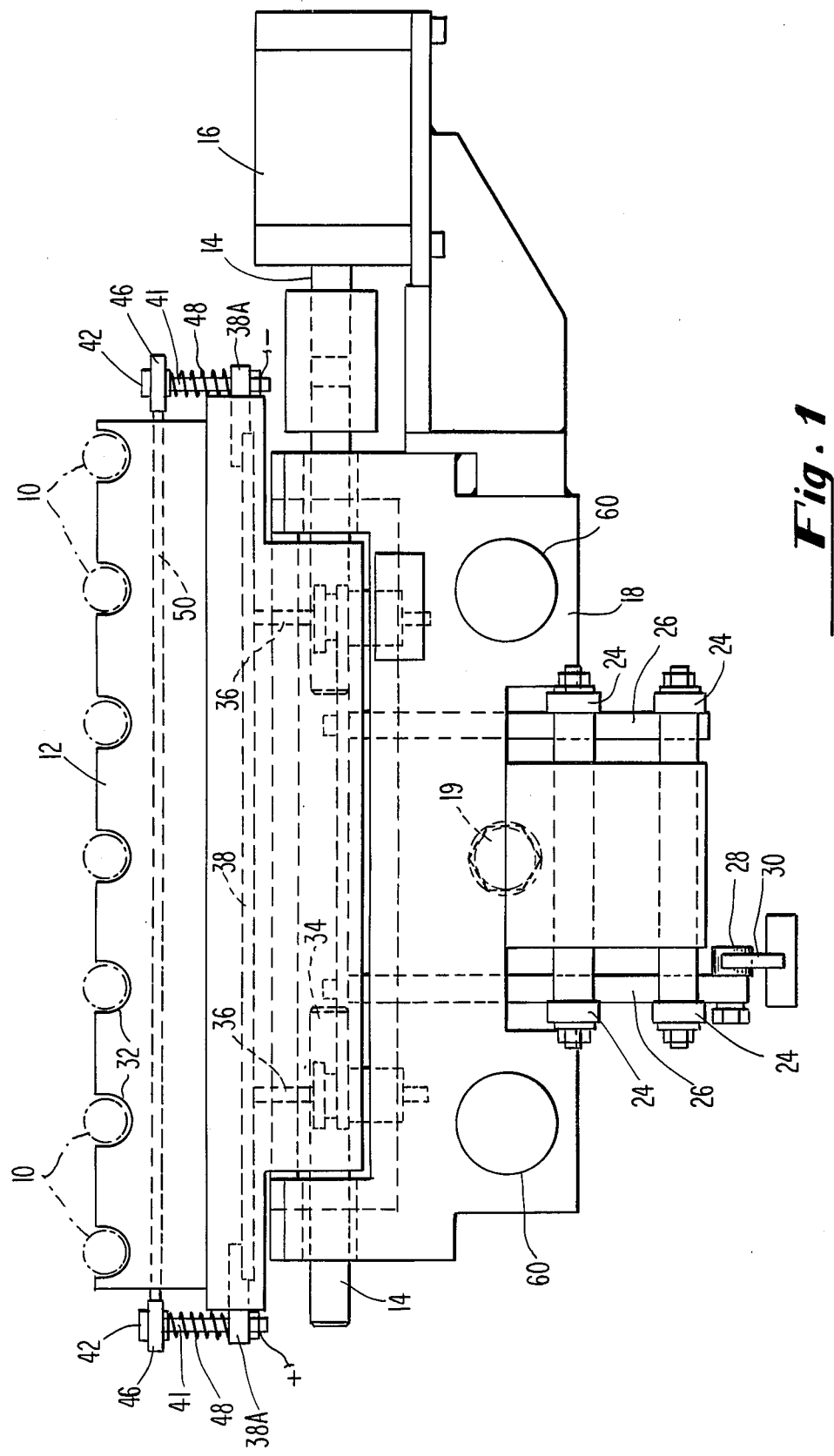

United States Patent [19]

Andrews

[11] 4,200,428
[45] Apr. 29, 1980

[54] AUTOMATIC MANDREL CHECKER

[75] Inventor: Karl H. Andrews, Millville, N.J.

[73] Assignee: Wheaton Industries, Millville, N.J.

[21] Appl. No.: 911,279

[22] Filed: May 31, 1978

[51] Int. Cl.² .......................... B29C 17/07; B29F 1/14
[52] U.S. Cl. .................................. 425/136; 425/139;
425/154; 425/165; 425/533; 425/537
[58] Field of Search ................. 264/97, 537, 538, 334,
264/40.1; 425/136, 137, 139, 165, 533, 154, 537

[56] References Cited
U.S. PATENT DOCUMENTS

| 3,700,369 | 10/1972 | Johnson | 425/139 |
| 3,834,848 | 9/1974 | Farrell | 425/136 |
| 3,918,866 | 11/1975 | Eichenberger et al. | 425/136 |
| 4,057,378 | 11/1977 | Wunderlich | 425/137 |

Primary Examiner—Jan H. Silbaugh
Attorney, Agent, or Firm—Miller & Prestia

[57] ABSTRACT

Apparatus for sensing contaminant material or hung-up work pieces on mandrels, such as the core rods of injection blow molding machines, consists of a sensing member adapted to be moved through a programmed path corresponding to the bottom contour edge of the mandrel and to give an output responsive signal when any material or work piece remains on the mandrel and interrupts the programmed movement of the sensing member. Generally, one or more horizontally extending mandrels are checked by a sensing member linked through a connecting member with a cam following a cam track corresponding in shape and located below the bottom contour edge of the mandrel to be checked. In the preferred form of the invention, an injection blow molding machine includes an automatic stripper and checker, in which stripping fingers associated with the connecting member precede the sensing member and thus strip a preformed work piece off the mandrel simultaneously with the checker sensing member movement along the mandrel length. Preferably, the sensing member consists of a horizontally disposed rod adapted to travel along either one or a plurality of parallel core rods with the sensing member forming part of an electrical circuit. Upon engagement of the sensing member with hung-up material or work piece, the sensing member is adapted to yield downwardly and thereby to open the circuit and provide a responsive output signal.

7 Claims, 5 Drawing Figures

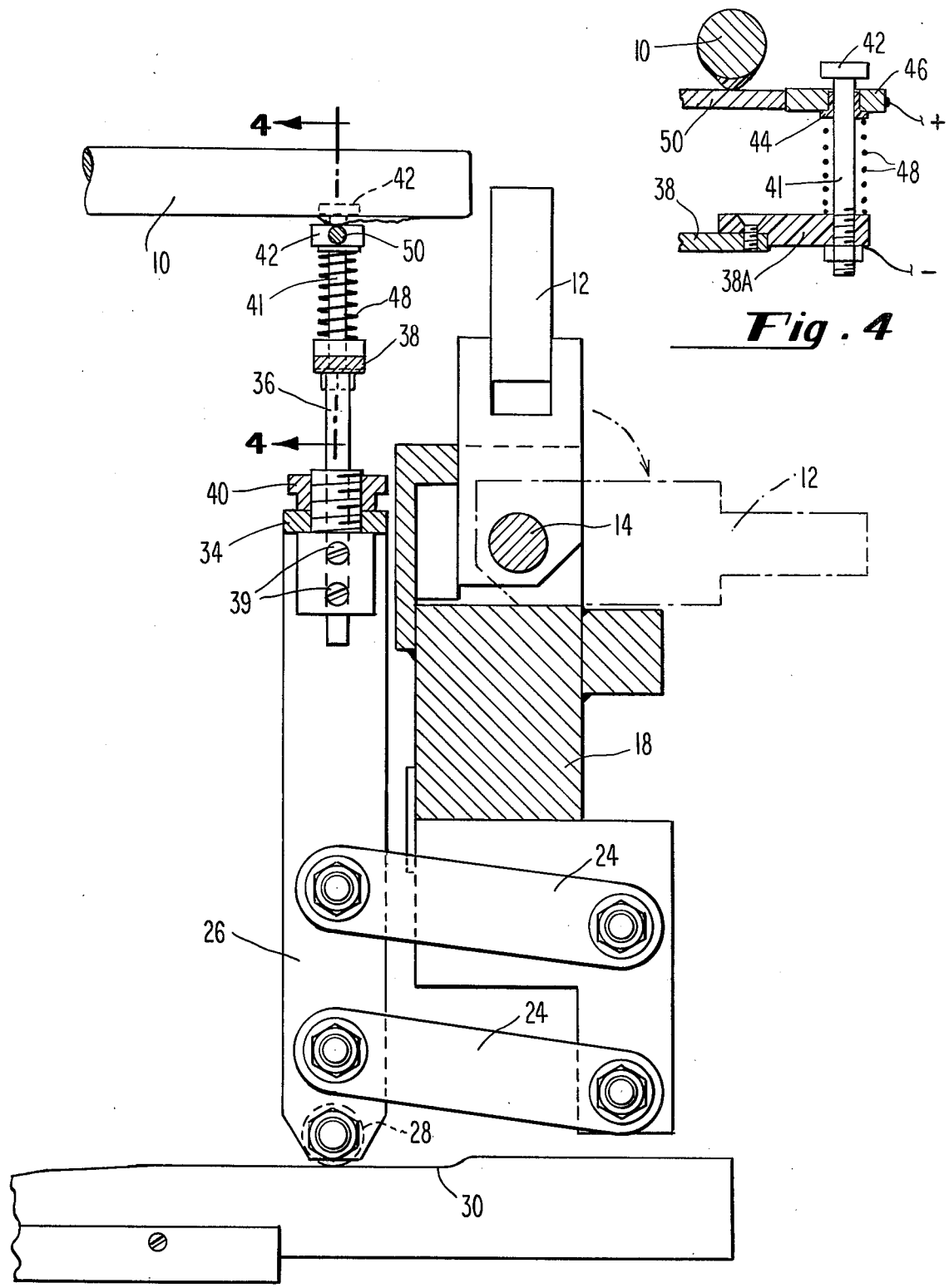
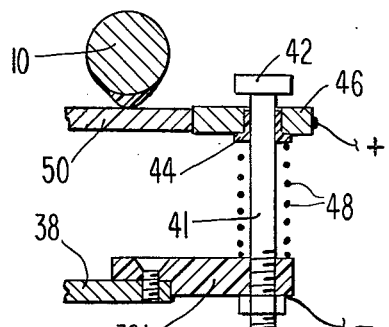
Fig. 4
Fig. 3

AUTOMATIC MANDREL CHECKER

This invention pertains to an automatic mandrel checker adapted to indicate the presence of foreign material on a generally horizontally extending mandrel. More particularly, this invention pertains to an injection blow molding machine with an automatic core rod stripper and checker.

Manufacturing apparatus often includes mandrels about which are formed various types of hollow work pieces. In the cyclic operation of such apparatus, it is often necessary regularly to check the mandrels, after a work piece has been formed thereon and removed and before the mandrel is reused for a subsequent operation, in order to ensure that a previously formed work piece, or part thereof or some material involved in the preceding manufacturing step, has not remained on the mandrel. Feeler gauges adapted to sense such foreign matter are often used automatically to check mandrels for this purpose.

In an injection blow molding machine, a plastic parison is first injection molded about a core rod (or mandrel). Subsequently, the parison is blown, such as by pressurized air introduced within the parison from the outer walls of the core rod, into a finished work piece configuration, such as a plastic bottle. If a previously formed product sticks to or for some reason otherwise remains on the core rod of if some portion of an unblown parison remains on the core rod, serious damage can result when the machine proceeds to position the core rod for subsequent formation of another parison thereon.

Thus, in applications such as injection blow molding machines, there is a need for a reliable and sensitive checker for automatically and regularly sensing for the presence of foreign material on a core rod during a specific stage of the manufacturing operation.

The general object of the present invention is to provide just such an automatic checker and more specifically to provide in an injection blow molding machine an automatic checker and stripping mechanism wherein previously formed work pieces are simultaneously stripped and the mandrel upon which they have been formed checked prior to reuse of the mandrel or core rod.

This object and other more specific objects such as will be apparent in the course of the subsequent description of this invention are met, briefly, by an automatic mandrel or core rod checker in which a sensing member is adapted to be moved along a path corresponding to the bottom contour edge of a generally horizontally extending mandrel or core rod and to give a responsive output signal if any foreign object or material remains thereon and thus interrupts the predetermined path of movement of the sensing member. Preferably, the sensing member is associated through a connecting member with a cam follower and cam track, which corresponds in shape and is disposed below and parallel to the bottom contour edge of the mandrel or core rod to be checked. Still more preferably, a plurality of parallel extending mandrels or core rods are checked simultaneously by a sensing member consisting of a horizontally extending rod suspended between connecting members and associated with a cam and cam track as described above. In this embodiment of the invention, the sensing member rod is adapted to yield downwardly in response to the presence of a foreign material on any one of the mandrels or core rods and thereby to open a circuit of which the rod is part.

Also, in the most preferred form of the present invention the connecting member is driven horizontally and attached to a connecting member element through a pivoted parallelogram arrangement. This connecting member element, upon which is mounted the cam and sensing member, is thus retained in its vertical orientation. The connecting member also has asssociated with it, stripping fingers adapted to precede the sensing member in the course of its movement along the mandrel or core rod and thereby to strip previously formed work pieces therefrom. Such an automatic stripper-checker mechanism is ideally suitable for use in an injection blow molding machine.

Figure 2:
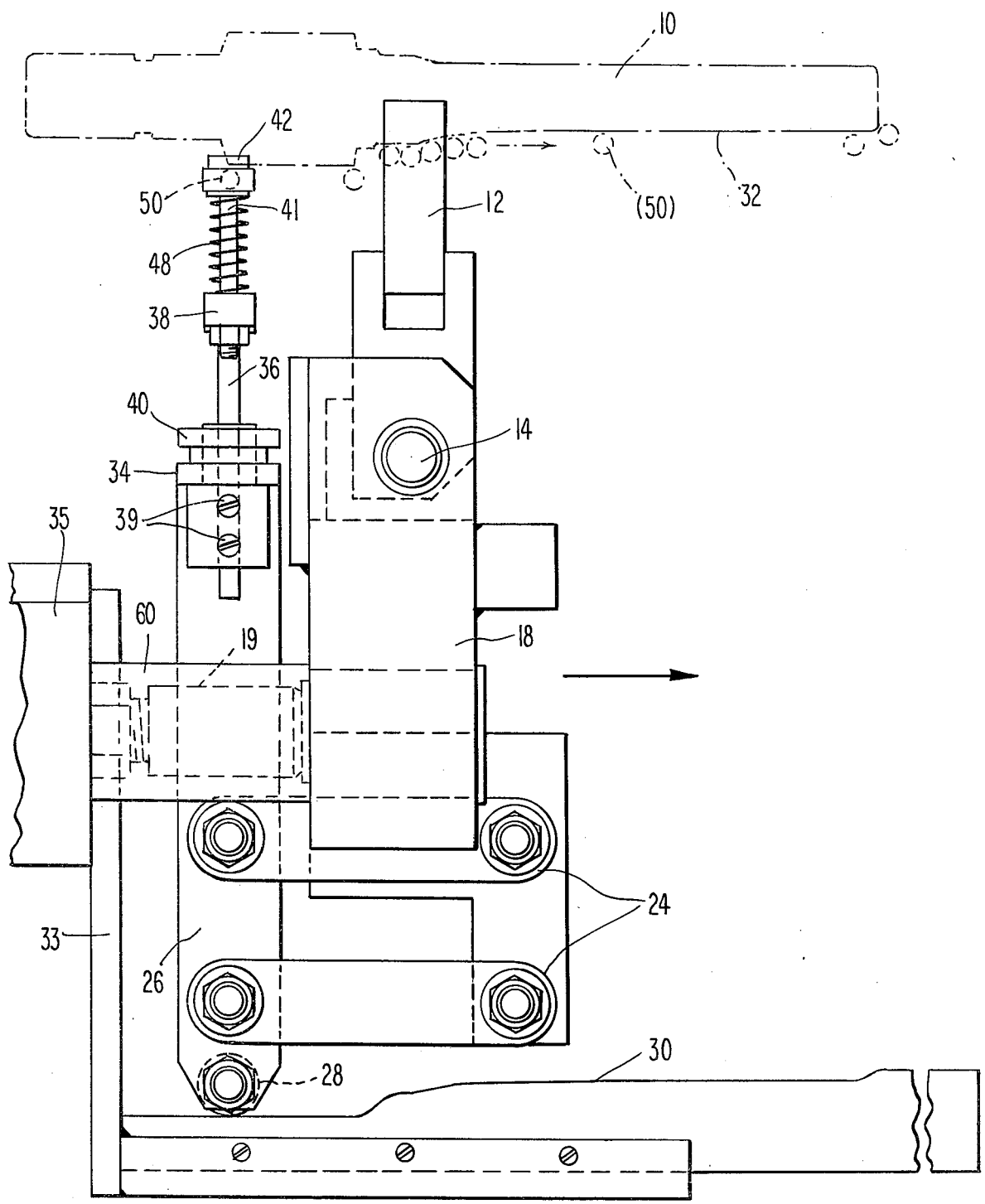
Figure 2A:
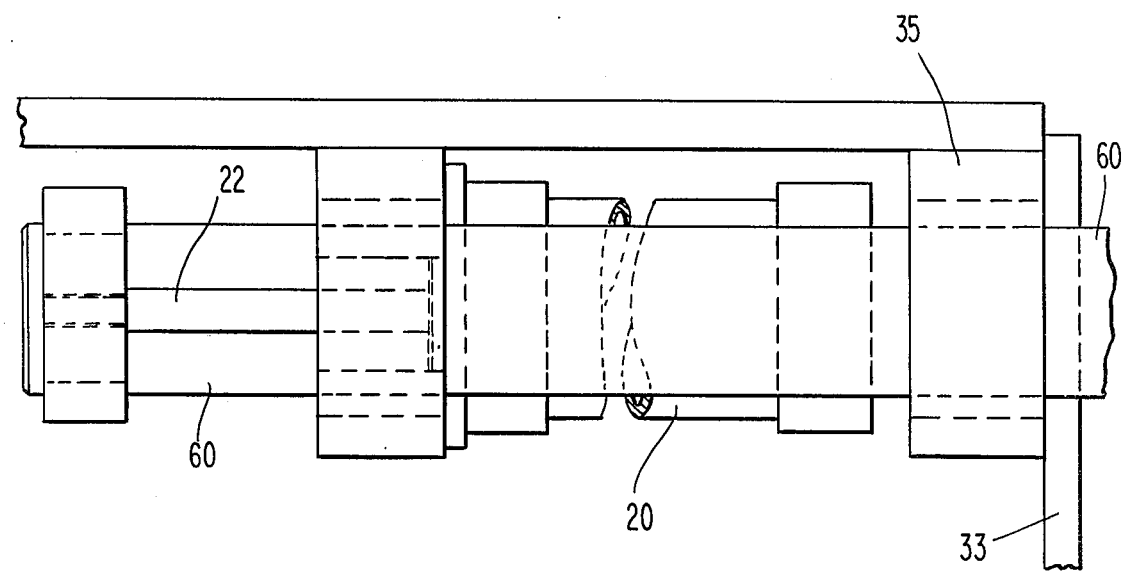

For a better understanding of this invention, reference may be made to the following detailed description thereof, taken in conjunction with the appended claims and the drawings, in which:

FIG. 1 is a front elevation view of an automatic mandrel checker-stripper, comprising the preferred embodiment of the present invention;

FIGS. 2 and 2A (together) comprise a left side elevation view of the automatic mandrel checker-stripper as shown in FIG. 1;

FIG. 3 is a side elevation view, partially in section, in which the stripper-checker mechanism is moved somewhat from the position shown in FIG. 2; and FIG. 4 is an expanded and sectional elevation view, in the plane 4—4 of FIG. 3, of the sensing member and connection thereof, in the apparatus otherwise shown in FIGS. 1-3.

Turning more specifically to FIGS. 1-3, there is shown a plurality of injection blow molding machine mandrels or core rods 10 engaged by stripping finger member 12. For directional delivery of work pieces at the outer limit of its horizontal stroke, stripping finger member 12 is connected to shaft 14, which is in turn adapted to be periodically rotated through a partial arc by rotaing cylinder 16. Horizontal movement is in turn imparted to shaft 14 and stripping finger member 12 by the mounting of shaft 14 in connection member 18.

The rotational movement of stripping finger member 12 at the outer end of its horizontal stroke is illustrated in phantom FIG. 3.

As seen in FIG. 2A, the horizontal actuation movement of the stripping mechanism and particularly the connecting member 18 is effected by cylinder 20 and piston rod 22 projecting therefrom, attached through tie bar 61 to guide rods 60, which slide through bushing block 35 associated with mounting plate 33 and are attached to connecting member 18. Stop member 19 is provided to limit the reverse horizontal movement of connecting member 18 and apparatus associated therewith at the conclusion of the actuation and return stroke.

Attached through pivotally attached parallelogram links 24 to connecting member 18, is separate, generally vertically disposed, connecting member element 26 associated at its lower end with a cam follower 28. Cam follower 28 is in turn engaged by and adapted to traverse generally horizontally along cam track 30, which corresponds in shape and is disposed parallel to and below the lower contour edge 32 of core rods 10. At the upper ends of connecting member elements 26, they are secured to a horizontally extending support bar 34, to which in turn is secured vertically projecting sensing member supports 36. Supports 36 are secured to and vertically adjustable within bar 34, the vertically adjusted position thereof being retained by set screws 39 and lock nut 40.

At the top of supports 36 is disposed a second support bar 38, in turn supporting, at its ends, upwardly extending pins 41 with an upper head stop 42.

As seen better in the detailed view of FIG. 4, upwardly extending pin 41 is insulated along its axial length, by an insulator 44, from sensor rod end 46, which otherwise is urged upwardly by coil spring 48.

Also, as better seen in FIG. 4, upwardly extending pin 41 is secured in a non-conductive end extension 38A of second support bar 38.

As illustrated in FIGS. 3 and 4, when sensor rod 50, which is urged upwardly into engagement with stophead 42, is forced downwardly against that urging by a work piece or foreign material on the outer surface of core rod 10, electrical contact is broken between stophead 42 and sensing member end 46. Accordingly, the presence of such foreign material is sensed by the provision, in the preferred embodiment of the present invention, of an electrical circuit formed between the two upwardly extending pins 41 at the opposite ends of sensor member 50. In the event that either or both ends of sensor member 50 are forced downwardly and away from engagement with upper stophead 42, the circuit is broken and an output signal is provided, which may be utilized to stop the machine or give an output visual or audio warning.

In operation of the apparatus shown in FIGS. 1–4, when a set of core rods is positioned at the stripping-checking station of an injection blow molding machine, in which the automatic stripper-checker of the present invention is incorporated, the piston in cylinder 20 is actuated and piston rod 22, connecting member 18 and connecting member element 26 are moved outwardly in a generally horizontal direction. Thus horizontally actuated, stripper finger member 12, moves work pieces formed on core rods 10 outwardly as cam follower 28 traces the path of the bottom edge contour of core rod 10 by following cam track 30, corresponding in shape thereto, thereby normally causing sensing member 50 to follow an identical path. If foreign material, such as unblown parison material or a work piece part is stuck on one of the core rods 10, sensing member 50, which is urged upwardly by coil spring 48, yields downwardly and causes a discontinuity in the electrical circuit otherwise established between upwardly extending pins 41 at the opposite ends of the machine, causing an output responsive signal which may be used to stop the machine or produce a visual or audio alarm.

At the outer limit of the horizontal stroke of finger member 12, rotating cylinder 16 rotates stripper finger member 12 downwardly, as shown in phantom in FIG. 3, causing work pieces engaged therein to be deposited just downward and outward of the outer limit of stripper finger member 12, at its lowered position.

Stripper finger member 12, sensor member 50 and their associated carrier equipment, including connecting member 18, are then returned to their starting position and core rods 10 are moved to their next work position.

While this invention has been described and illustrated with respect to a specific embodiment, it is not limited thereto and the appended claims are intended to be construed to encompass other variations and modifications of the invention which may be made by those skilled in the art without departing from the true spirit and scope thereof. For example, while vertical and horizontal orientations are referred to, the invention may also be incorporated in an apparatus of different orientation so long as the elements of the invention function together in the same manner as in the embodiment illustrated and described.

Having described my invention, I desire to claim and secure by letters patent, the following:

1. Automatic mandrel checker adapted to indicate the presence of foreign material on a generally horizontally extending mandrel having a non-linear profile, said checker consisting of a sensing member urged upwardly to a vertical position along a line corresponding to the bottom edge of the mandrel which said checker is adapted to check, and a sensor member moving means for moving said sensor member generally horizontally and for displacing said sensor member vertically, the resultant path of movement of said sensor member corresponding to the bottom edge contour of said mandrel and means responsive to any interference with said sensor member movement to indicate the presence on said mandrel of foreign material.

2. Automatic mandrel checker, as recited in claim 1, wherein said sensor member moving means comprises a cam track which corresponds in shape to the bottom edge contour of said mandrel and is disposed below and parallel thereto, a cam member on said cam track, a connecting member to which is attached said cam member and said sensing member, said sensing member mounting permitting said member to yield downwardly, said responsive means being adapted to respond to said downward yielding movement, and said connecting member being connected to a horizontal driving means.

3. Automatic mandrel checker, as recited in claim 2, wherein the mandrel which said checker is adapted to check is one of a plurality of identical such mandrels extending parallel to one another in a horizontal plane, and said sensor member comprises a rod adapted simultaneously to check the bottom edges of all of said mandrels at corresponding points thereon, said rod being attached to said connecting member at spaced points along the length of said rod, said connecting member attached to a cam, in turn riding on said cam track.

4. Automatic mandrel checker, as recited in claim 3, wherein said connecting means is connected to said horizontal driving means through pivotally mounted parallelogram links.

5. Automatic mandrel checker, as recited in claim 4 wherein said sensing member rod forms part of an electrical circuit when said member is in its upwardly urged, non-yielded position, which circuit is open upon downward yielding movement of said member relative to said connecting member.

6. In an injection blow molding machine having a work stripping station at which an injection blow molded product mounted on a mandrel is stripped therefrom, an automatic mandrel checker, as recited in any one of claim 2, 3, 4, or 5, said checker disposed at said work stripping station and adapted to strip said product from said mandrel at said station, said connecting member of said checker being connected to stripping fingers adapted to traverse said mandrel ahead of said sensing member in the course of said horizontal movement thereof and thereby to strip a work piece formed thereon.

7. An injection blow molding machine having a work stripping station at which an injection blow molded product mounted on a mandrel is stripped therefrom and having an automatic mandrel stripper and checker as recited in claim 5 disposed at said work stripping station and adapted to strip said product from said mandrel at said station, wherein said electrical circuit is formed by contacts with said sensing member rod at the opposite ends thereof.

* * * * *